A. VOTAW.
Wagon-Brake.
No. 62,789.  Patented Mar. 12, 1867.
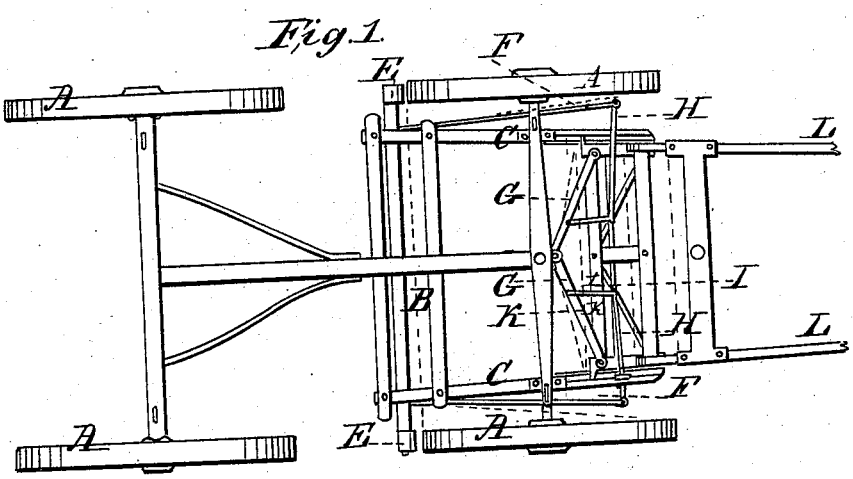
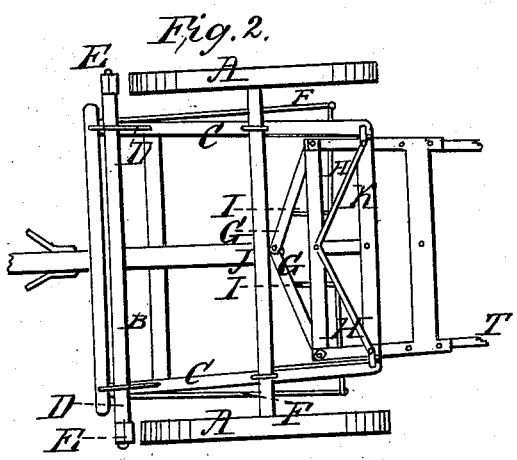
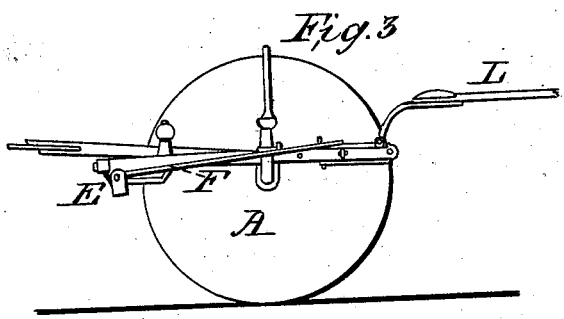

United States Patent Office.

AARON VOTAW, OF NEW GARDEN, OHIO.

Letters Patent No. 62,789, dated March 12, 1867.

---

IMPROVEMENT IN WAGON BRAKE.

---

The Schedule referred to in these Letters Patent and making part of the same.

---

TO ALL WHOM IT MAY CONCERN:

Be it known that I, AARON VOTAW, of New Garden, in the county of Columbiana, and State of Ohio, have invented certain new and useful improvements in Carriage Locks; and I do hereby declare that the following is a full and complete description of the construction and operation of the same, reference being had to the accompanying drawings, making a part of this specification, in which—

Figure 1 is a top view of the carriage with the lock attached.

Figure 2 is an under side view of the same.

Figure 3 is a detached section.

Like letters of reference refer to like parts in the views.

A, fig. 1, are the wheels on which the frame of the carriage is mounted, and which is constructed in the ordinary way; this lock is attached to the fore part of the frame, and acts upon the front wheels in the way as follows. B is a bar extending across the under side of the hounds C, and which is made to work backward and forward in the stays D, and is supported by the same in the position shown in the drawing. On each end of this bar is pivoted a cam or rubber, E, in line with the face of the wheel, and on which it acts, as will hereafter be shown. F are links connecting the bar B to the levers G by the intermediate links H and I. The levers G are pivoted together to the axle J, and the outer end to the adjustable frame K, which is stayed, and made to slide backward and forward between the front end of the hounds. L are the thills, and are attached to the adjustable frame with a clip in the ordinary way.

The practical operation of this lock is as follows: It will be seen that on pushing the frame K back by the thills, as indicated by the dotted lines a, fig. 1, and which will be the result on the carriage going down hill, the levers G will be forced back at the same time, and in so doing will draw the end of the link H, to which the link I is connected, in the same direction, the link I being made to slide through a staple in the frame, and also the direction of the link being at such an angle with the direct action of the frame that as it is drawn back it is made to spread outward, still more thereby causing the link H to move out laterally at the same time it is drawn back; this forces the link F out in the direction indicated by the dotted lines a, fig. 1. As the link F moves outward, it draws the bar B forward, and thereby brings the rubber against the wheel with a force equal to the weight of the carriage descending the hill, as exerted upon the levers G and resisted by the team. When the carriage has arrived at the bottom of the hill, and the downward pressure thereby released, the frame K is then drawn forward, producing a reverse action of the levers G, which forces the rubber or cam back from the wheel, as shown in the drawing. By this it will be evident that the lock is self-acting, hence requiring no effort on the part of the driver to apply it, and when applied it is always equal to the circumstances demanding its application. It will be seen that the rubber is not pivoted to the bar by having the pivot pass through the centre but at one side, thus making it eccentric in its action on the pivot, producing by this means a cam, the purpose of which is that it may offer no resistance to the wheel when the carriage is backed, for, on backing, the reverse action of the wheel turns the rubber downward and outward from the wheel, and thus brings the upper side of the cam or rubber, which is thinner by its being hung eccentrically and rounded at the top, towards the wheel, and thereby does not touch or rub hard, as it would do if the wheel turned in the opposite direction. The forward movement of the wheel brings the swell of the cam as the rubbing surface. By thus making the rubber to act as a cam, by pivoting it eccentrically to the bar, it can offer no resistance to the wheels when backing.

What I claim as my improvement, and desire to secure by Letters Patent, is—

1. The bar B, cam E, as arranged, in combination with the links F H I, levers G, and adjustable frame K, as and for the purpose set forth.

2. The bar B, cam E, as arranged in relation to the wheels A, and operated by the frame K, levers G, and links F, H, and I, for the purpose and in the manner described.

AARON VOTAW

Attest:
THOS. J. GRAHAM,
A. M. GARSIDE.